United States Patent [19]

Gobeli

[11] Patent Number: 4,506,914
[45] Date of Patent: Mar. 26, 1985

[54] SECURITY SEAL

[75] Inventor: Garth W. Gobeli, Albuquerque, N. Mex.

[73] Assignee: The United States of America as represented by the United States Department of Energy, Washington, D.C.

[21] Appl. No.: 322,143

[22] Filed: Nov. 17, 1981

[51] Int. Cl.³ .............................................. B42D 15/00
[52] U.S. Cl. ........................................ 283/70; 283/74; 283/78; 283/85
[58] Field of Search ........................ 283/70, 72, 74, 78, 283/85, 69, 75, 86, 109, 110, 91; 206/807; 356/71, 389

[56] References Cited

U.S. PATENT DOCUMENTS

| | | | |
|---|---|---|---|
| 3,511,571 | 5/1966 | Ogle | 356/71 |
| 3,597,045 | 8/1971 | Mathisen | 350/162 SP |
| 3,604,806 | 9/1971 | Redman | 356/71 |
| 3,814,904 | 6/1974 | Russell et al. | 283/75 X |
| 3,894,756 | 7/1975 | Ward | 283/75 X |
| 3,917,402 | 11/1975 | Ohta | 356/71 |
| 3,933,304 | 1/1976 | Judd | 206/807 X |
| 4,171,864 | 10/1979 | Jung et al. | 283/75 X |
| 4,227,805 | 10/1980 | Schiller | 356/71 |
| 4,269,473 | 5/1981 | Flothmann et al. | 283/86 X |
| 4,386,795 | 6/1983 | Charles et al. | 283/75 |

OTHER PUBLICATIONS

Schuenzel, E. C. and Moore, R. L., IBM Technical Disclosure Bulletin, vol. 13, No. 1, p. 176, Jun. 1970.

Primary Examiner—Paul A. Bell
Assistant Examiner—Taylor J. Ross
Attorney, Agent, or Firm—George H. Libman; Albert Sopp; Judson R. Hightower

[57] ABSTRACT

Security for a package or verifying seal in plastic material is provided by a print seal with unique thermally produced imprints in the plastic. If tampering is attempted, the material is irreparably damaged and thus detectable. The pattern of the imprints, similar to "fingerprints" are recorded as a positive identification for the seal, and corresponding recordings made to allow comparison. The integrity of the seal is proved by the comparison of imprint identification records made by laser beam projection.

9 Claims, 6 Drawing Figures

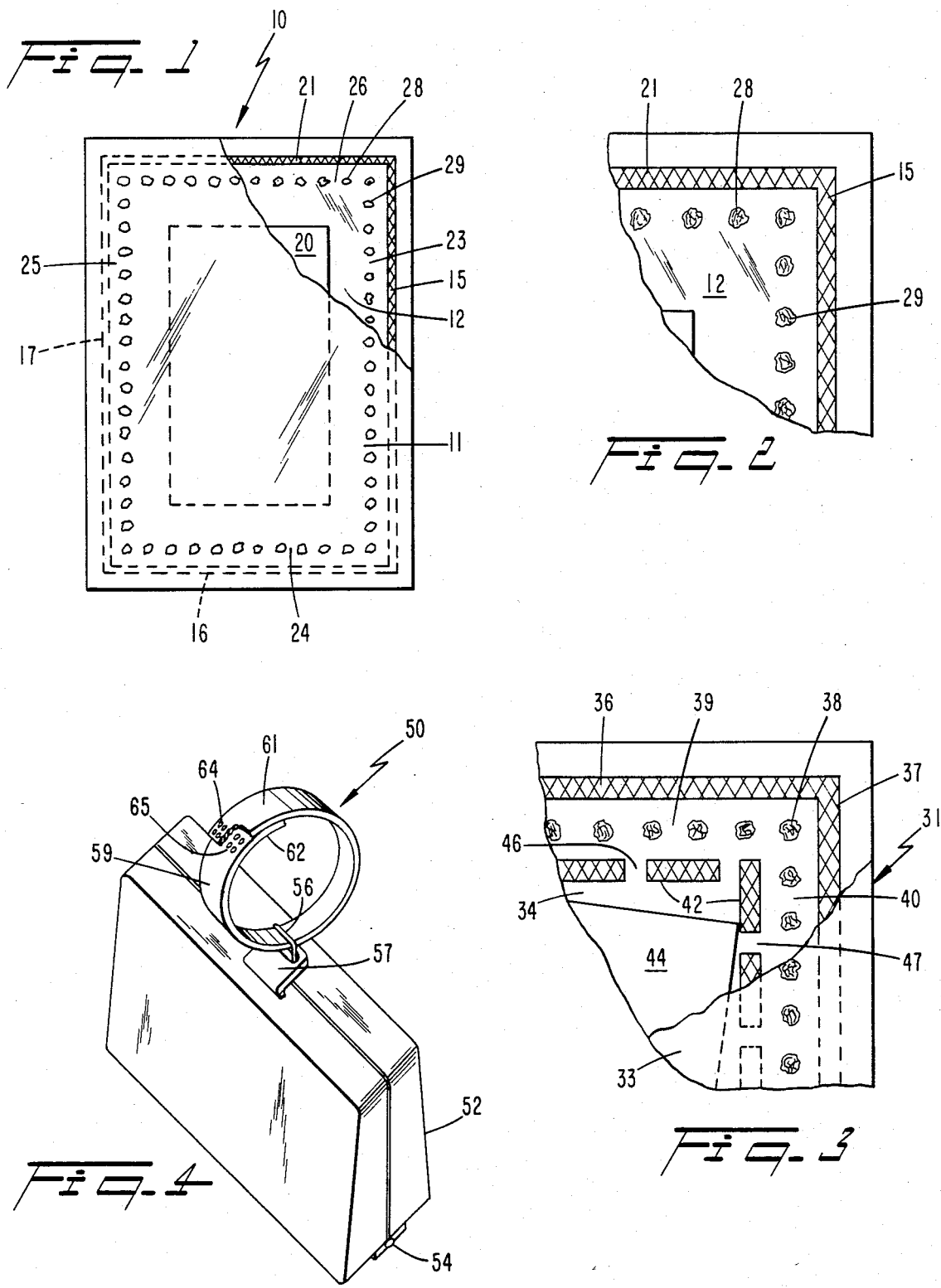

SECURITY SEAL

BACKGROUND OF THE INVENTION

The present invention relates to a seal for protecting items to be maintained secure or in confidence, and a method utilizing the seal; and more particularly, to a seal modification uniquely marking the seal with identification protecting it against tampering or substitution and to utilization of such a seal in preserving the integrity of items in a package. The United States Government has rights in the invention pursuant to Contract No. DE-AC04-76DP00789 between the Department of Energy and Western Electric Company (41CFR§9-9.109-6(i) (5) (ii) (b)).

Seal tampering indicator devices known to the art normally ensure continued visibility of the opening of a sealed container. A device disclosed in U.S. Pat. No. 3,933,304 typifies this art in a showing of an elongated container whose sealed ends and other parts carry printed matter adapted to be mutilated upon opening of the container.

The detection of attempts at disguising seal tampering is also found treated in the known art as exemplified by the disclosure of U.S. Pat. No. 3,313,052. Disclosed there is the use of a light-polarizing material as an overlay laminated to a backing for protecting the integrity of information carried by the backing and covered by the overlay. Although cuts made to the overlay exposing the information to tampering can be made undetectable to the naked eye by resealing or re-fusing the overlay with heat, properties of the light-polarizing material altered at the sites of intrusion are revealable under a light-polarizing analyzer. However, the resulting product of the patented protective procedures are duplicable, and thus the object of these procedures can be circumvented by repeating such procedures upon a violated backing stripped of its original light-polarizing polarizing overlay.

Thus, in accordance with the present invention it is an object to provide a new and improved security seal overcoming the shortcomings of the prior art as indicated above.

It is a more specific object of the present invention to provide a simplified, low cost security seal wherein the material of enclosure and closure retaining structures accepts verifiable identification markings.

It is a still further object of the present invention to provide an improved technique for verifying the protective competency of a seal.

SUMMARY OF THE INVENTION

Characterizing the seal of the present invention are overlying layers of plastic material thermally fused at selected portions. The material is tough plastic, ordinarily flexible film, having a moderately high termal-compression fusion capability. The fused portions include discrete, uniquely contoured dot-like formations formed in the plastic by application of a combination of heat and pressure by a suitable tool. Derived from these unique formations is a trace or print seal readable in a manner to produce representations in the nature of a "fingerprint" by which the seal is identifiable. The print seal is preferably recorded, such as on photographic film, for future comparison when authorized access to the secured contents is desired.

In one of the invention's embodiments disclosed herein it conjoins with a continuous fin seal extending around the plastic sheets thereby forming a receptacle. Protective fin seal segments in still another embodiment isolate the contents of the package from the print seals thus preventing inadvertent damage thereto. In another embodiment, the invention forms a hasp-closure loop-seal for a container. However, each print seal of either embodiment is distinguishable by its own trace lines for establishing an identifying "fingerprint." If there is an attempt at tampering or replacement of an original receptacle or loop-seal, it can be detected since the new seals could not be made with the same distinguishing trace lines of the original.

If entry into the receptacle or breaking the loop-seal is attempted, such action is certain to introduce discrepancies detectable in any reading of the prints when checking their genuineness. Thus, access to the enclosed contents protected by the invention is detectable when a reading of a print or series of prints does not match the record made in the initial reading.

Each of the fused print seals produced in the practice of the invention can exist only as a unique product, or in other words, the lines and other structural characteristics of the prints effectively defy duplication. Each unique print seal can be fully relied on to ensure the protection of the secured package contents.

A BRIEF DESCRIPTION OF THE DRAWING

FIG. 1 is a partially cut-away elevational view of a sealed receptacle embodying one form of the invention;

FIG. 2 is an enlarged view of a portion of FIG. 1 more fully illustrating the series of fused print seals;

FIG. 3 is a showing in part of an alternative form of the sealed receptacle illustrated in FIGS. 1 and 2;

FIG. 4 is a perspective view of a sealed container embodying a second form of the invention;

DETAILED DESCRIPTION OF THE INVENTION

Figure 5:
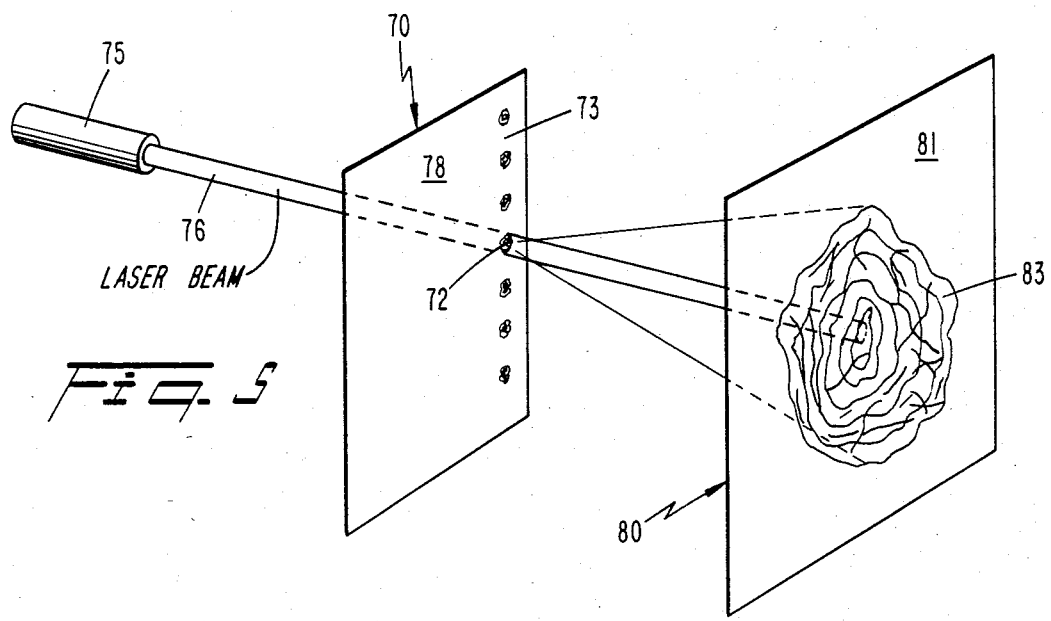
FIG. 5 is a schematic illustration of an arrangement for reading the print seals characterizing the invention and producing resultant identification photographic records.

With reference to FIGS. 1 and 2 of the drawings, a receptacle 10 is shown as having a pair of relatively transparent flexible walls 11 and 12 superimposed in a facing alignment. Tough, flexible plastic, preferably vinyl, film having a moderately high-temperature thermal compression fusion-type closure property is especially suitable material for walls 11 and 12. However, the use of other similarly fusable plastics is contemplated to satisfy requirements of specific applications.

To seal around the periphery of the walls 11, 12 and thus form a package, heated dies of appropriate width are brought to bear on the superimposed walls. The sealing areas extend a relatively short distance from and parallel to outer edges of the walls (see FIGS. 1 and 2). With appropriate heat and pressure applied, thermal fusing of the plastic material occurs between the walls with the production of fin seals or strips 15, 16, and 17 forming pillow-type receptacle 10 closed on three (3) sides.

After this initial receptacle forming, a contents 20 requiring security in handling and transport may be received through the unsealed further edges of walls 11 and 12. Thermally-fused fin seal 21 is then produced in a manner heretofore explained completing the receptacle 10. A portion of wall 11 is broken away in FIG. 1 for showing the underlying fin seals 15, 21 as well as other seal structure to be described.

It will be evident that the foregoing structure and procedure advantageously obtains a hermetically-sealed receptacle 10. The contents 20 are secured with a full perimeter seal substantially immune to inadvertent delamination and opening.

Operatively interrelated with the fin seals 15, 16, 17 and 21 are trace or print seals imprinted on the plastic as one or more heat-seal dot-like formations. FIG. 1 shows such print seals imprinted generally in rows 23, 24, 25 and 26 positioned just within the perimeter of the receptacle's fin seals. The individual print seals are each unique formations created by means of randomly controlled applications of heat and pressure to the surface of walls 11,12.

Preferably, each print seal is imprinted by a relatively small area, blunt-nose end of a soldering iron-like implement sufficiently heated and pressure applied to thermally fuse the wall material in the localized area. The random applications result in imprinting variously shaped discrete print seals in the wall material. The print seals taken together constitute rows 23, 24, 25 and 26.

As each print seal is imprinted, the heat sealing parameters, such as the heat applied, size, pressure and movement during engagement of the heat seal dies and the tension in each localized area are inherently varied. If desired, the print seals may all be formed, either individually or in concert, by a machine having a gang of dies, with each individual die havings its size, heat, and pressure and instantaneous movement randomly varied by computer. Similarly, the tension in the walls 11, 12 may be varied. Thus, each of the formations carries upon and within the fused material its own characteristic contours.

With further reference to FIGS. 1 and 2 of the drawings, typical print seals 28 and 29 are found to vary one from the other in their distinctly different shapes and contours. As will be explained in greater detail hereinbelow, the characteristic trace lines or contours of any one print seal 28, 29 are subsequently caused to act as a screening instrumentality in the production of a permanent record. The record is like a "fingerprint" or "signature" belonging to the formation, and such records made for the several print seals of a particular receptacle constitute the identifying composite "fingerprints" for the receptacle.

In the alternative form receptacle 31 partially shown in FIG. 3 of the drawings, walls 33 and 34 are secured, as explained above, with fin seals 36, 37 along an unbroken path extending perimetrically adjacent the edges of the receptacle. Trace or print seals 38 in rows 39 and 40 are representative of such formations made an integral part of the receptacle 31 in a manner heretofore described in disclosing receptacle 10.

In accordance with the improvement, walls 33 and 34 of receptacle 31 are additionally secured together by seal segments or strips 42 of thermally fused wall material positioned within receptacle 31 and between the print seals 38 and contents 44 enclosed by the receptacle. Thus, strips 42 are disposed end-to-end and slightly spaced in ranks, represented in FIG. 3 by ranks 46 and 47. Although seal segments 42 are seals helping to secure together walls 33 and 34, these strips serve primarily to protect the print seals 38 from possible disabling damage from shifting of the contents 44. In short, the rows of seal segments 42 act as a buffer between the fused material of the print seals 38 and a shifting contents 44 due to handling of the receptacle.

Pictured in FIG. 4, representing a further embodiment of the present invention, is a sealed loop closure 50 securing the contents of a separate suitcase-like container 52. The container 52 includes a common hinge 54 facilitating pivoting the halves to afford access to the contents. On the opposite side of the container is a hasp assembly including a staple 56 and hasp 57 to secure the container.

The loop closure 50 comprises a band 59, made of thermal-fusing plastic material, such as is identified above. The band 59 forms a permanent loop through the staple of the hasp assembly by fusing material and imprinting trace or print seals at overlapping ends 61, 62 of the band. The band ends are in effect fixedly joined by imprinting in their plastic material trace or print seals 64, corresponding to those heretofore described in disclosing receptacles 10 and 31. The print seals 64 are shown generally aligned in rows (note row 65) extending transversely across band 59. A portion of the seal area of end 61 of the band 59 has been broken away to show the print or formation actually formed on the underneath end 62.

Retention capacity of the fused material of the print seals 64 can be supplemented by applying one or more fused seal strips to the overlapping ends 61, 62 in a manner disclosed above.

The exemplary arrangement for reading out and recording data contents of the print seals is shown schematically in FIG. 5. Initially the arrangement utilizes a laser beam or collimated light to create a readable image of each trace or print seal. The image displays the seal's uniqueness in terms of its line contours and consistency.

Thus, illustrated in FIG. 5 is a receptacle 70 provided with print seals 72 aligned in a row 73. A laser light source 75 is in place to project its collimated light beam 76 normally upon a plane 78, representative of the sealed walls of receptacle 70.

Typically the diameter of the trace as print seals 72 ranges from 0.1 to 2 millimeters. A helium-neon laser light source providing an approximately 2 millimeter beam is particularly suitable for the purposes of the present invention. However, the diameter of the light beam is normally adjusted to about twice the trace formation diameter so that precise centering of the trace formation in the beam is not necessary.

Positioned parallel to plane 78 on the side of the receptacle 70 opposite to that of the laser beam source 75 is an image detector-recorder apparatus 80 having an active surface 81 to be impinged by enlarged light pattern 83 originating from the illuminated area of the print seal 72. In essence, apparatus 80 images a cross-section of direct light beam 76 plus scattered light patterns emanating from light diffused and diffracted by three-dimensional trace contours characterizing the shape of the print seal 72. It is thus evident that any such trace image is distinguished by direct and scattered light patterns of strong individuality.

Suitable photo detectors known to the art having utility in apparatus 80 include photographic film and electronic circuitry employing photocell arrays. For recording detected images in the apparatus 80, any of the conventional mediums including photographs and magnetic disks and tapes, are employed.

Figure 6:
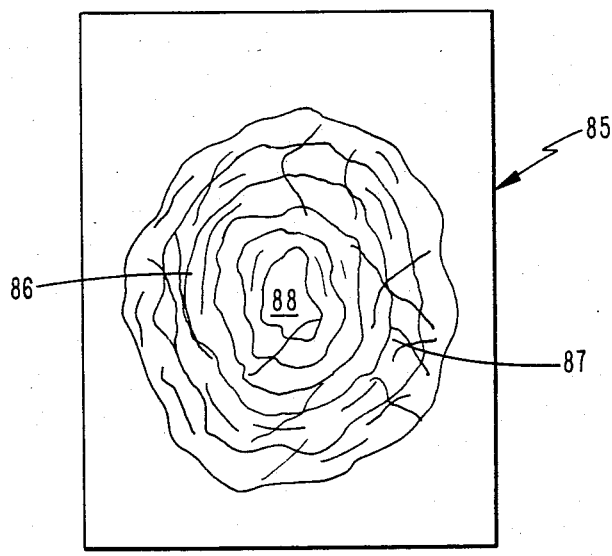
FIG. 6 is a representation of a photographic record made in reading out a print seal in accordance with the teaching of FIG. 5.

In FIG. 6, an enlarged trace or print seal is imaged in record 85. By way of example, there are illustrated random, irregular lines in masses of varying density appearing in areas 86 and 87. These portions of the image are indicative of the aforesaid scattered light patterns. A clear area 88 may be present at random locations providing further identity to the print seal being projected.

It should be recognized that the present invention has particular utility as a security measure in transporting objects subject to handling restrictions, and with respect to documents to be maintained in inviolate confidence. Accordingly, such objects and documents are desirably made contents of a receptacle or container by a security officer following the teachings of FIGS. 1 to 4. Immediately after this packaging of the contents, including imprinting a requisite number of print seals, the security officer detects and records the composite print seals following teachings of FIGS. 5 and 6. Records thus made from the print seals constitute the identifying "fingerprints" of the packaging. Copies of the records are forwarded separately by the officer to the point of delivery of the package, either in as a series of photographs or as electronic (TV) displays.

Upon receipt of the package at its point of delivery a reprocessing of its print seals by another security officer is made. The two sets of records are compared. Tampering with the packaging to reach its contents is thereby discernible since that action would entail marring of the print seals.

Furthermore, providing a new receptacle and an attempt to duplicate the parameters of sealing of the print seals is impossible and thus would be detected. Also, attempting thermal re-sealing of an entry effort produces substantially different trace contours and line profiles, which are readily detectable.

Likewise detectable are chemical bonding re-seal efforts since the changes in optical homogeneity, or nonhomogeneity as in this case, is produced by such an activity.

Of course, mechanical entry to the packaging by cutting along the seams of seals can be visually detected. Closely spaced print seals adjacent the seal strips make even the smallest undetected intrusion in this area an essentially impossible task. In any event, plastic material used in packaging is distinctly anisotropically strained due to its manufacturing procedure and through cross-polarizer examination exhibits distinctive optical characteristics. Relief of these mechanical strains by cuts in the material produces optical "activity" or variations along the boundaries of such cuts that cannot be disguised by resealing, whether chemically or thermally. Consequently, employing the present invention effectively precludes either the otherwise undetectable substitution of packaging or clandestine entry as a means of unauthorized access to the contents of the packaging.

The foregoing description of preferred embodiments of the invention has been presented for purposes of illustration and description. It is not intended to be exhaustive or to limit the invention to the precise forms disclosed, and obviously many modifications and variations are possible in light of the above teaching. Other and different distributions of print seals are contemplated to cover various items and unusual shapes, and other types of probing beams and detector-recorders are contemplated as being usefully to process the data of trace formations, in accordance with the broadest aspects of the invention. For example, employing an averaged optical absorption of the material over the print seal area utilizing a wavelength of measurement which coincides with the absorption band of the material, may be desirable. For packaging plastics, the wavelength normally resides in the 2 to 15 micromillimeter range.

It should now also be evident that one or more print seals imprinted in an appended seal authenticating documentation have utility to allow verification, similar to that described above. The disclosed embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of protecting the security of contents of a package having a first seal in transparent plastic material comprising the steps of:
    thermally imprinting in said plastic material a print seal characterized by random configurations of said material;
    directing a beam of electromagnetic radiation energy through said plastic material including said print seal to produce a distinctive pattern of said energy, the distinctive pattern being determined by the random configurations of said material of said seal; and detecting said distinctive pattern and producing a record of said detection.

2. The method of claim 1 wherein is further provided repeating said pattern detection and recording steps at a subsequent time; and
    comparing the records of detection made initially and subsequently for determining presence of an identity between said records thereby establishing the print seal is free of tampering.

3. The method of claim 1 wherein said electromagnetic radiation is a laser light beam directed normally to a plane of said material imprinted with said print seal.

4. The method of claim 1 wherein said first seal extends along a perimeter of said package and a plurality of said print seals are imprinted adjacent to said first seal.

5. The method of claim 4 including the additional step of forming a second seal in said plastic material parallel to and spaced from said first seal, said print seals being imprinted in said material between said first and second seals.

6. The method of claim 1 wherein said distinctive pattern is a dot having a maximum diameter of approximately 2 mm.

7. A security package having a unique identification, said package comprising opposed sheets of transparent plastic material having first package seal means for sealing said sheets together to enclose the contents, wherein the improvement comprises:
    second package seal means for sealing said sheets together extending parallel to and spaced from said first package seal means,
    thermally imprinted print seal means, spaced between said first and second package seal means, for defining a random configuration of said material, said print seal means fusing said opposed sheets only in a localized area defining a dot-like formation.

8. The security package of claim 7 wherein said print seal means comprises a plurality of said dot-like formations extending between said first and second package seals.

9. The security package of claim 8 wherein each dot-like formation has a maximum diameter of 2 mm.

* * * * *